US006298353B1

(12) United States Patent
Apte (10) Patent No.: US 6,298,353 B1
(45) Date of Patent: Oct. 2, 2001

(54) CHECKING SERIALIZATION COMPATIBILITY BETWEEN VERSIONS OF JAVA CLASSES

(75) Inventor: Ajay A. Apte, Austin, TX (US)

(73) Assignee: International Business Machines Corporation, Armok, NY (US)

( * ) Notice: Subject to any disclaimer, the term of this patent is extended or adjusted under 35 U.S.C. 154(b) by 0 days.

(21) Appl. No.: 09/195,873

(22) Filed: Nov. 19, 1998

(51) Int. Cl.[7] ................................................. G06F 17/30
(52) U.S. Cl. ............................ 707/103; 707/10; 707/203
(58) Field of Search .................................. 707/103, 203, 707/10; 709/203

(56) References Cited

U.S. PATENT DOCUMENTS

| | | | | |
|---|---|---|---|---|
| 5,740,405 | * | 4/1998 | DeGraaf | 707/203 |
| 5,983,242 | * | 11/1999 | Brown et al. | 707/203 |
| 6,014,674 | * | 1/2000 | McCargar | 707/202 |
| 6,085,198 | * | 7/2000 | Skinner et al. | 707/103 |

OTHER PUBLICATIONS

Senivongse, Enabling Flexible Cross–Version Interoperability for Distributed Services, IEEE online, p. 201–210, Sep. 1999.*

* cited by examiner

*Primary Examiner*—Jean R. Homere
*Assistant Examiner*—Greta Robinson
(74) *Attorney, Agent, or Firm*—David A. Mims, Jr.; Bracewell & Patterson, L.L.P.

(57) ABSTRACT

A process for determining the compatibility of two or more versions of a single serialized class of objects residing on a data processing system is disclosed. The process is completed in a series of steps. First, two or more versions of the class are inputted into a process environment of the data processing system. Following this, each version of the class is divided into a serialized stream of elements. Finally, the stream of elements of one version of the class are compared with the stream of elements of another version of the class to find incompatible differences between the versions.

27 Claims, 3 Drawing Sheets

CHECKING SERIALIZATION COMPATIBILITY BETWEEN VERSIONS OF JAVA CLASSES

BACKGROUND OF THE INVENTION

1. Technical Field

The present invention relates in general to a method and system for improved data processing systems, and more specifically to an improved data processing system which utilizes Java Beans or Java software applications. Still more particularly, the present invention relates to an improved data processing system utilizing Java Beans or Java software applications wherein a determination is made as to the serialization compatibility between versions of Java classes.

2. Description of the Related Art

Figure 1:
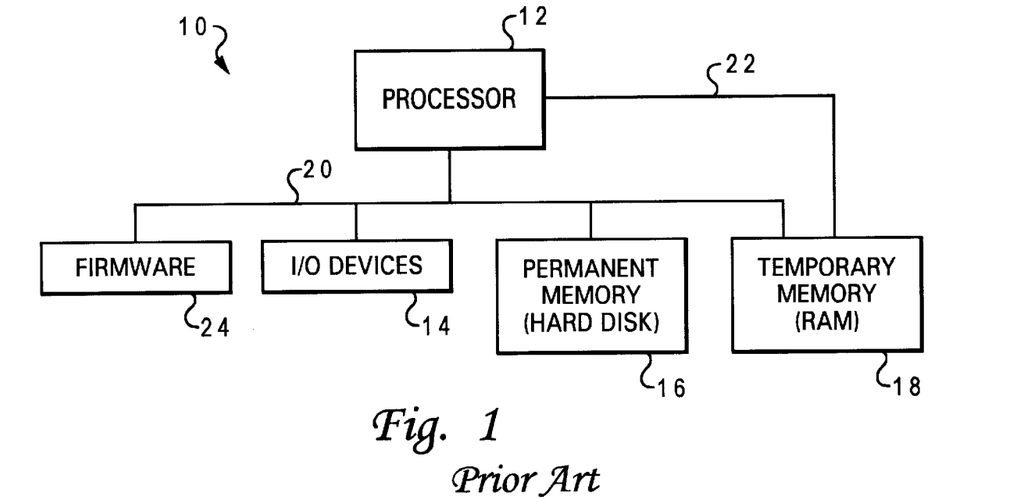
FIG. 1 is a block diagram of a conventional data processing system.

A generalized structure for a conventional data processing system 10 as shown in FIG. 1 includes one or more processing units 12 connected to a permanent storage device (hard disk) 16, system memory device (random access memory or RAM) 18, firmware 24, and to various peripheral or input/output (I/O) devices 14. The I/O devices typically include a display monitor, a keyboard, and a graphical pointer (mouse). System memory device 18 is utilized by a processing unit 12 in carrying out program instructions, and stores those instructions as well as data values that are fed to or generated by the programs. Processing unit 12 communicates with the other components by various means, including one or more interconnects (buses) 20, or direct access channels 22. A data processing system may have many additional components such as serial and parallel ports for connection to, e.g., printers, and network adapters. Other components might further be utilized in conjunction with the foregoing; for example, a display adapter might be utilized to control a video display monitor, and a memory controller can be utilized to access the system memory, etc.

A data processing system program is accordingly a set of program instructions which are adapted to perform certain functions by acting upon, or in response to, the I/O devices. Program instructions that are carried out by the processor are, at that lowest level binary in form, i.e., a series of ones and zeros. These executable (machine-readable) program instructions are produced from higher-level instructions written in a programming language. The programming language may still be low-level such as assembly language (which is difficult to utilize since instructions appear as hexadecimal bytes), or may be a higher level language in which instructions are created utilizing more easily understood words and symbols. One example of a high level programming language is "C" (or its improved version "C++"). After a computer program is written in C++, it is converted into machine code utilizing a compiler (which reduces the high-level code into assembly language) and a linker (which transforms the assembly language into machine code).

In an attempt to simplify programming, and yet still provide powerful development tools, programmers have created "object-oriented" programming languages in which each variable, function, etc., can be considered an object of a particular class. C++ is an example of an object-oriented programming language, and provides advanced programming features such as polymorphism, encapsulation, and inheritance.

"Java"™ is another object-oriented programming language and was developed by Sun Microsystems, Inc. Java is similar to the C++ programming language, but Java is smaller, more portable, and easier to utilize than C++ because it manages memory on its own. Java programs are compiled into bytecodes, which are similar to machine code but are not specific to any platform. Currently, the most widespread use of Java is in programming small applications (applets) for the World Wide Web of the Internet. These applets do not run as separate programs, but rather are loaded within another application that has Java support, such as a web browser. The term "applet" is particularly utilized to refer to such programs as they are embedded in-line as objects in hypertext markup language (HTML) documents.

The portability, security, and intrinsic distributed programming support features of the Java programming language make this language useful for Internet programming. Java is a totally object-oriented, platform independent programming language, which achieves architectural independence by compiling source code into its own intermediate representation. Java source code is not compiled into normal machine code, but is translated into code for a virtual machine specifically designed to support Java's features. A Java interpreter or a Java-enabled browser then executes the translated code.

Component software architectures employ discrete software components to quickly prototype and flesh out interactive applications. Applications are built by combined a set of independent components with developer-written code which acts as a "glue" between components, usually responding directly to component events by setting component properties or invoking component methods. One currently popular component software architecture is the Java Bean specification of the Java programming language.

Java Beans provide a component model for building and utilizing Java-based software components. The Java Beans application programming interface (API) makes it possible to write component software in the Java programming language. Components are self contained, reusable software units that can be visually composed into composite components, applets, applications, and servlets utilizing visual application builder tools. A "Bean" is simply a Java class with extra descriptive information, similar to the concept of an object linking and embedding (OLE)-type library. Unlike an OLE library, however, a Bean is usually self-describing, including a file which contains the class, symbol information and method signatures and which may be scanned by a development tool to gather information about the bean, a process referred to as introspection. Any Java class with public methods may be considered a bean, but a bean typically has properties and events as well as methods.

Such components can be visually composed into units utilizing visual application builder tools which are utilized only to develop other programs. Components expose their features(for example public methods and events) to builder tools for visual manipulation. A Bean's features are exposed because feature names adhere to specific design patterns. A "JavaBeans-enabled" builder tool can then examine the Bean's patterns, discern its features, and expose those features for visual manipulation.

A Java Bean component is generally made up of a non trivial number of related classes and data files. This complicates tool interface and internal workings. The capability to store and retrieve Java objects is essential to building all but the most transient applications. The key to storing and retrieving objects is representing the state of objects in a serialized form sufficient to reconstruct the object. The class is broken down into a stream of data. When the stream is read back by the same version of the class, there is no loss of information or functionality. The stream is the only source of information about the original class.

Objects to be saved in a stream may support either a serializable interface or the externalizable interface. Within a stream the first reference to any object results in the object being serialized or externalized and the assignment of a handle for that object. Subsequent references to that object are encoded as the handle. Utilizing object handles preserves sharing and circular references that occur naturally in object graphs. Subsequent references to an object utilize only the handle allowing a very compact representation.

The class of a Java object is defined as the behavior of a particular object in an object-oriented programming and a user defined type which specifies the representation of objects of the class and the operation that can be applied to said objects. A Java object's serialized form must be able to identify and verify the Java class from which the object content was saved and restore the contents to a new instance. Objects to be stored and retrieved refer frequently to other objects. Those other objects must be stored and retrieved at the same time to maintain the relationship between the objects. Thus, when an object is stored, all of the objects that are reachable from that object are stored as well.

Each object acting as a container implements an interface that allows primitive data types and objects to be stored in or retrieved from it. These are the object output and object input interfaces which are provided to a stream to write to and read from the stream. They also handle requests to write primitive types and objects to the stream. Object input streams can be extended to utilize customized information in the stream about classes or to replace objects that have been deserialized.

Object serialization has been designed to provide a rich set of features for Java classes. It produces and consumes a stream of bytes that contain one or more primitive objects. The objects written to the stream in turn refer to other objects which are also represented in the stream. Object serialization produces just one stream format that encodes and stores the contained object. Other container formats such as OME or OpenDoc have defense stream or file system representations.

Each object which is stored in the stream must explicitly allow itself to be stored and must implement the protocols needed to save and restore its state in an object stream. Object serialization defines two such protocols, serializable and externalizable. The protocols allow the container to ask the object to write and read its state.

There are two ways in which an object can be stored in storage. One is in serializable form in which all the work needed to be done is completed by Java itself. The Java Virtual Machine (JVM) decides what needs to be stored. The class itself does nothing. With a serializable interface, the object's stream includes sufficient information to restore the field in the stream for enabling a version of the class. For a serializable class, object serialization must automatically save and restore fields of each class of an object, and automatically save and restore classes that evolve by adding fields or super types. A serializable class can declare which of its fields are transients (not saved or restored) and write and read optional values and objects.

The second way to store an object is in its externalizable form in which instance of the class does all the work. The JVM does nothing. Object serialization produces a stream with information about the Java classes for the objects that are being saved. With an externalizable class, objects serialization delegates to the class complete control over its external format and how the state of the super type is saved and restored. Also, with an externalizable interface, the class is solely responsible for the external format of its contents.

For serializable objects, sufficient information is kept to restore these objects or those objects even if a different but compatible version of the classes implementation is present. The interface serializable is defined to identify classes that implements the serializable protocol. A serializable object must implement the java.io.serializable interface. Additionally, it must mark its fields that are not to be persistent with the transient keyword. It can implement a writeObject method to control what information is saved or append additional information to the stream. It can also implement a readObject method, so that it can read the information written by the corresponding write object method or update the state of the object after it has been restored. Object output streams and object input streams are designed and implemented to allow the serializable class to evolve, whereby changes are allowed to the classes that are compatible with the earlier versions of the class.

In dealing with externalizable objects, only the identity of class of the objects is saved by the container and it is the responsibility of the class to save and restore the contents. An externalizable object must implement java.io.externalizable interface. Additionally, it must implement a writeExternal method to save the state of the object. It must explicility coordinate with its super type to save its state. It must implement a readExternal method to read the data written by the writeExternal method from the stream and restore the state of the object. It must explicitly coordinate with the supertype to save its state. If writing an externally defined format, the write external and read external methods are solely responsible for that format. The write external and read external methods are public and raise the risk that a client may be able to read or write information in the object other than by utilizing its methods and fields. These methods must be utilized only when the information handled by the object is not sensitive or when exposing it would not present a security risk.

During deserialization, the private state of the object is restored. For example, a file descriptor contains a handle that provides access to an operating system resource. When Java objects utilize serialization to save state and files or as binary large objects (blobs) in databases, the potential arises that the version of a class reading the data is different than the version that wrote the data. Versioning raises some fundamental questions about the identity of a class, including what constitutes a compatible change, i.e. a change that does not affect the contract the class and its calling.

Several assumptions are made in dealing in versions of serialized objects. First, versioning will only be applied to serialized classes since it must control the stream format to achieve its goals. Externalizable classes will be responsible for their own version in which it is tied to the external format. Second, all data and object must be read from or skipped in the stream in the same order as they were written. Third, classes evolve individually as well as in concert with super types and subtypes. Fourth, classes are identified by name, two classes of the same name may be of different versions or completely different classes that can be distinguished only by comparing their interfaces or by comparing hashes of the interfaces. Fifth, default serialization will not perform any type conversions, and sixth, the stream format only needs to support a linear sequence of type changes, not arbitrary branching of a type.

When a Java object is serialized, i.e. written out to an output stream, all of the non-transient and non-static instance variables of that object are written out. During the serialization from an input stream, the default serialization mechanism of Java Virtual Machine (JVM) utilizes a symbolic model for binding the fields in the stream to the fields in the corresponding class in the virtual machine. In a development environment such as BeanExtender of International Business Machines (IBM), it is possible that the classes change sufficiently from one version of the product to another. This may result in a situation where a serialized instance from an old version of a class can not be deserialized and reconstructed into an instance of a new version of the same class. This happens since the class implementation breaks serialization compatibility from an old version to a new one.

In the evolution of classes, it is the responsibility of the evolved later version class to maintain the contract established by the non-evolved class. This takes two forms. First, the evolved class must be not break the existing assumption about the interface provided by the original version so that the evolved class can be utilized in place of the original. Secondly, when communicating with the original or previous versions the evolved class must provide sufficient and equivalent information to allow the earlier version to continue to satisfy the non-evolved contract. For the purposes of this invention, each class implements and extends the interface or contract being defined by its supertype. New versions of a class must continue to satisfy the contract for older version and may extend the interface or modify its implementation.

For any commercial software application, it is often necessary that the data files and the state information saved utilizing the old version of the product are readable by the new version. For object oriented Java bailed applications, Java provides the object serialization model for persisting the state and instant information of application classes and instances. However, the Java serialization model is such that changes made to a class between successive releases of a product may result in a situation where serialized or saved instance of an old version of a class can not be deserialized or restored and reconstructed into an instance of a new version of the same class. This happens when certain kinds of changes made to a class breaks serialization compatibility from an old version to a new version. Currently there is no automated technique that checks for the compatibility between two versions of the same class in two different releases and makes sure that the successive product releases are backward compatible. This could be a recurring problem for a product that is developed in multiple releases. The current invention implements a tool that would check the serialization compatibility between versions of a class.

In order to fix the problem of version compatibility so that it is possible to read an instance of a newer version of a class from a serialized older version, it is necessary to have in-depth knowledge of the way class and instances data is written to stream by JVM. Presently, no automated means exist for checking the compatibility. It would therefore be desirable to provide a system or method that would implement a tool which introspects two versions of a class of Java Beans and figure out whether it would be possible to reconstruct an instance of a new version of the class from a serialized older version, or alternatively, to implement the tool that would check the serialization compatibility between different versions of a class of Java Beans and possibly point out ways to fix the problems for a particular case. Additionally, it would also be desirable to provide an automated technique that checks the compatibility between two versions of the same class of different releases or different versions of Java Beans and ensure that the successive product releases are backward compatible.

SUMMARY OF THE INVENTION

It is therefore one object of the present invention to provide an improved data processing system.

It is another object of the present invention to provide an improved data processing system which utilizes Java Beans or Java software applications.

It is yet another object of the present invention to provide an improved data processing system utilizing Java Beans or Java software applications wherein a determination is made as to the serialization capability between versions of Java classes.

The foregoing objects are achieved as is now described. A process for determining the compatibility of two or more versions of a single serialized class of objects residing on a data processing system is disclosed. This process is completed in a series of steps. First, two or more versions of the class are inputted into a process environment of the data processing system. Following this, each version of the class is divided into a serialized stream of elements. Finally, the stream of elements of one version of the class are compared with the stream of elements of another version of the class to find incompatible differences between the versions. In one implementation of the preferred embodiment, the class of objects are Java based objects. The comparison step is completed utilizing Java introspection.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The serialization compatibility checking tool checks the compatibility between two versions of the same class by matching them against the set of rules for type changes affecting serialization defined in the object's serialization specification. The compatibility checking tool utilizes Java introspection techniques to match the interfaces implemented, data types of instances, instance variables, class hierarchy and method signatures in two versions of the class. Any change in the class implementation that can result in failure to resurrect a saved class instance makes the two versions of the class incompatible. This technique provides Java developers with a preventive measure in the test cycle of product development. In such cases, this technique is utilized to compare old and new versions of all the classes in the application/product and find out the changes that can potentially break the data compatibility.

Alternatively, the invention may also be implemented in a builder tool in one embodiment, wherein the builder tool warns the programmer as soon as the changes are made to a class that might result in stream incompatibility. Another embodiment permits the serialization compatibility checking tool to be utilized as command line java tool. In yet another embodiment, it is called utilizing its static method for checking class compatibility. If utilized as a command line tool, the tool can be invoked as a Java command which utilizes as its arguments an old version of the class and the new version of the class.

When utilized from another program, it can be implemented by calling the static method checkCompatibility. The tool utilizes the type changes to the serialization as defined above and also the compatible changes both of which are included in the JavaSoft specification. More specifically, the invention implements an algorithm based on the specifications of JavaSoft. It is an automation process which formalizes a concept of checking compatibility. It may be applied to any two classes or alternatively, to a bunch of classes within two products to ensure the products compatibility.

The following are recognized as the principle aspects of the design for versioning of serialized object streams. The default serialization mechanism will utilize a symbolic model for binding the fields in the stream to the fields in the corresponding class in the virtual machine. Each class referenced in the stream will uniquely identify itself, its supertype, and the types and name of each nonstatic and nontransient field written to the stream. The fields are ordered with the primitive types first sorted by field name, followed by the object fields sorted by field name.

Two types of data may occur in the stream for each class: required data (corresponding directly to the nonstatic and nontransient fields of the object); and optional data (consisting of an arbitrary sequence of primitives and objects). The stream format defines how the required and optional data occur in the stream so that the whole class, the required, or the optional parts can be skipped if necessary. The required data consists of the fields of the object in the order defined by the class descriptor. The optional data is written to the stream and does not correspond directly to fields of the class.

The class itself is responsible for the length, types, and versioning of this optional information. If defined for a class, the write object/read object methods supersede the default mechanism to write/read the state of the class. These methods write and read the optional data for a class. The required data is written by calling defaultWriteObject and read by calling defaultReadObject. The stream format of each class is identified by the utilization of a Stream Unique Identifier (SUID). By default, this is the hash of the class. All later versions must declare the SUID that they are compatible with. This guards against classes with the same name that might inadvertently be identified as being versions of single class. Subtypes of ObjectOutputStream and Object InputStream may include their own information identifying the class using the annotateClass method; for example, MarshalOutputStream embeds the Uniform Resource Locator (URL) of the class.

Incompatible changes to classes are those changes for which the guarantee of interoperability can not be maintained. Several of the incompatible changes that may occur while evolving a class and are checked dynamically in the illustrative implementation of the present invention are:

Deleting fields—If a field is deleted in a class, the stream written will not contain its value. When the stream is read by an earlier class, the value of the field will not set to the default value because no value is available in the stream. However, this default value may adversely impair the ability of the earlier version to fulfill its contract.

Moving classes up or down the hierarchy—This cannot be allowed since the data in the stream appears in the wrong sequence.

Changing a nonstatic field to static or a nontransient field to transient—This is equivalent to deleting a field from the class. This version of the class will not write that data to the stream, so it will not be available to be read by earlier versions of the class. As when deleting a field, the field of the earlier version will be initialized to the default value, which can cause the class to fail in unexpected ways.

Changing the declared type of a primitive field—Each version of the class writes the data with its declared type. Earlier versions of the class attempting to read the field will fail because the type of the data in the stream does not match the type of the field.

Changing the write object or read object method so that it no longer writes or reads the default field data or changing it so that it attempts to write it or read it when the previous version did not. The default field data must consistently either appear or not appear in the stream.

Changing a class from serializable to externalizable or visa-versa is an incompatible change since the stream will contain data that is incompatible with the implementation in the available class.

Removing either serializable or externalizable is an incompatible change since when written it will no longer supply the fields needed by older versions of the class.

Alternatively, several of the compatible changes allowed to a class are handled dynamically within the invention as follows:

Adding fields—When the class being reconstituted has a field that does not occur in the stream, that field in the object will be initialized to the default value for its type. If class-specific initialization is needed, the class may provide a read object method that can initialize the field to non default values.

Adding classes—The stream will contain the type hierarchy of each object in the stream. Comparing this hierarchy in the stream with the current class can detect additional classes. Since there is no information in the stream from which to initialize the object, the class' fields will be initialized to the default values.

Removing classes—Comparing the class hierarchy in the stream with that of the current class can detect that a class has been deleted. In this case, the fields and objects corresponding to that class are read from the stream. Primitive fields are discarded, but the objects referenced by the deleted class are created, since they may be referred to later in the stream. They will be garbage-collected when the stream is garbage-collected or reset.

Adding write object and read object methods—If the version read in the stream has these methods, then read object is expected, as usual, to read the required data written to the stream by the default serialization. It should call default read object first before reading any optional data. The write object method is expected as usual to call default write object to write the required data and then may write optional data.

Removing write object and read object methods—If the class reading the stream does not have these methods, the required data will be read by default serialization, and the optional data will be discarded.

Adding java.io.serializable—This is equivalent to adding types. There will be no values in the stream for this class so its fields will be initialized to default values. The support for subclassing nonserializable classes require that the class' super type have a no-arg constructor and the class itself will be initialized to default values. If the no-arg constructor is not available, the NotSerializationException is thrown.

Removing java.io.serializable so that it is no longer serializable—This is equivalent to removing the class, and it can be dealt with by reading and discarding data for the class.

Changing the access to a field—The access modifiers public, package, protected, and private have no effect on the ability of serialization to assign values to the fields.

Changing a field from static to nonstatic or transient to nontransient—This is equivalent to adding a field to the class. The new field will be written to the stream but earlier classes will ignore the value since serialization will not assign values to static or transient fields.

Figure 2:
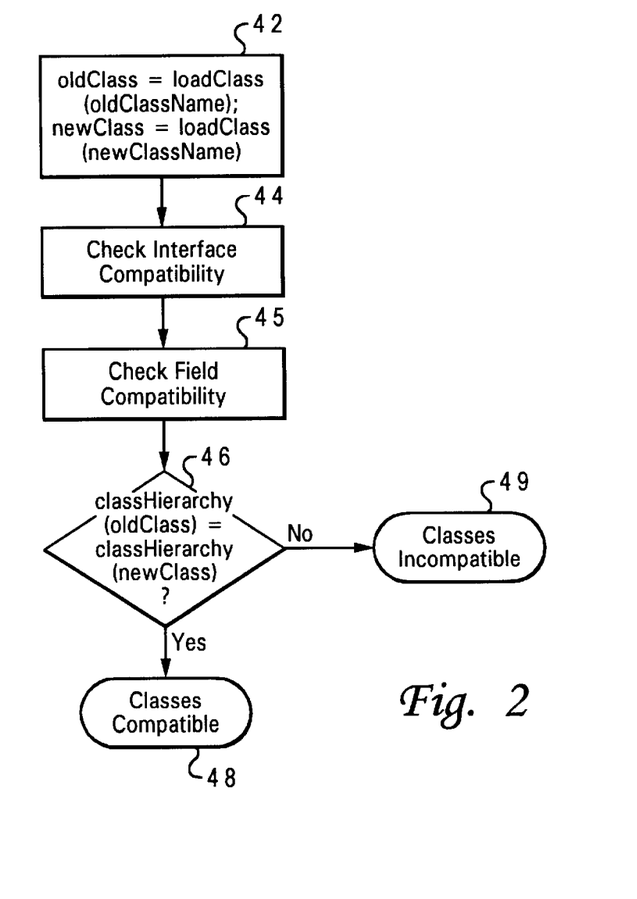
FIG. 2 is a flow diagram according to one implementation of the invention illustrating the algorithm which checks first the interface compatibility and then the field compatibility to determine whether both classes of the invention are compatible.

With reference now to the figures and in particular with reference to FIG. 2, there is depicted the generalized flow structure of the invention showing the various implementations including the checking of the interface compatibility as illustrated in block 44 and the field compatibility illustrated in block 45 and finally the class hierarchy as shown in block 46 according to one embodiment of the invention. In accordance with this embodiment, the old version is loaded onto the data processing system. The old version represents the older version of the class as depicted in block 42. The new version is also loaded onto the data processing system. The new version represents the newer version of the class. The invention first checks the interface compatibility as illustrated in block 44, following which the field compatibility shown in block 45 of the class is checked. The class hierarchy of the old version is checked against the class hierarchy of the new version depicted in block 46. If the class hierarchy of the old version is equivalent or similar in structure to that of the new version, then the versions are deemed compatible as illustrated in block 48. If however, the class hierarchy of the old version is not equivalent to that of the new version, then the versions are deemed incompatible as shown in block 49.

Figure 3:
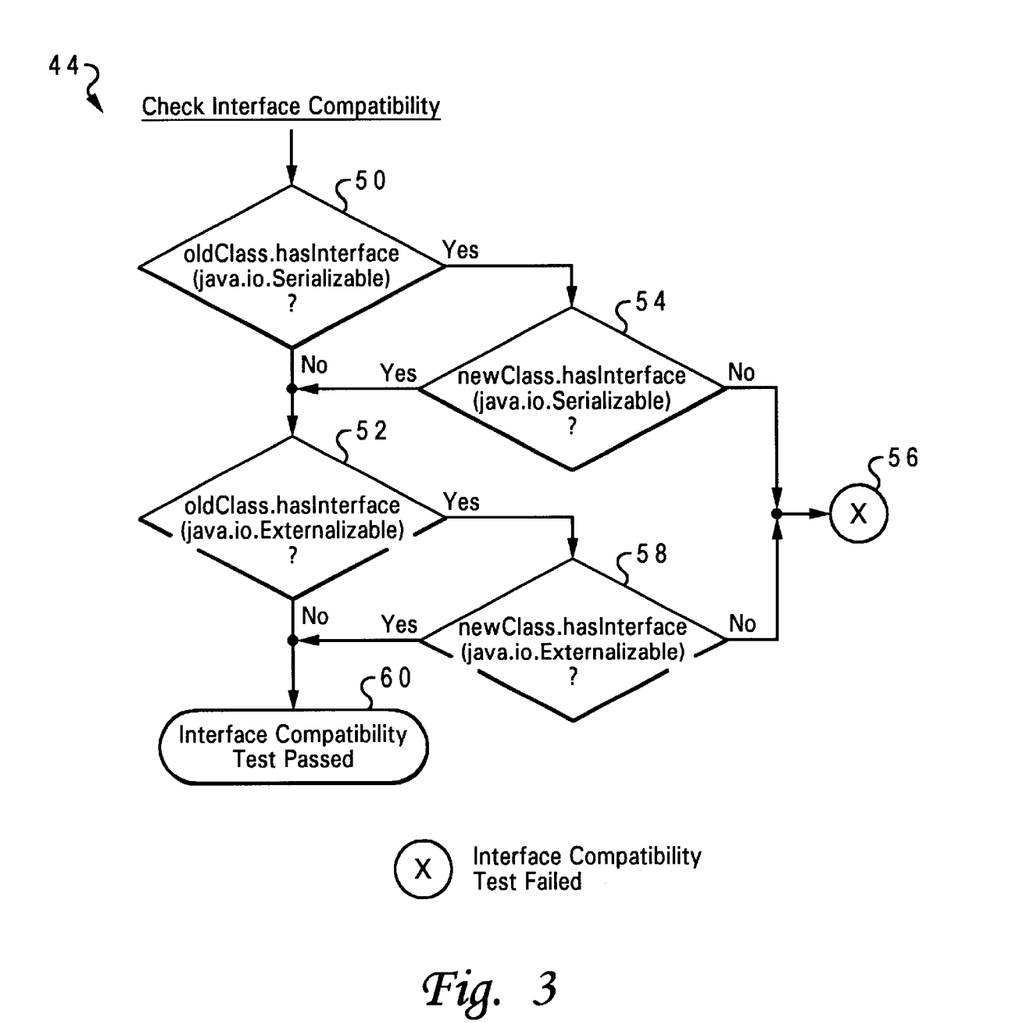
FIG. 3 is a high level flow diagram depicting the invention processing to check the interface compatibility according to one implementation of the present invention.

FIG. 3 is a high level depiction of the process by which the interface compatibility 44 is analyzed according to one embodiment of the invention. First, a determination is made as to whether or not the old class (i.e older version) has serializable interface as shown in block 50 utilizing the java.io.serializable command. If the older version does have serializable interface, the new version is also checked for serializable interface as shown in block 54. If both the serializable interfaces are present or alternatively, the old version does not have a serializable interface, then the process moves on to check the externalizable interface as depicted in block 52. If however, the new version does not have serializable interface as shown in block 54 while the old version does as illustrated in block 50, the interface compatibility fails as depicted in block 56.

The process is repeated for the externalizable interface checking first the old version as shown in block 52 utilizing the java.io.Externalizable command before checking the new version externalizable interface as illustrated in block 58. As above, if the old version has an externalizable interface and the new version does not, compatibility fails as depicted in block 56. However, if the old version does not have an externalizable interface or if both versions have an externalizable interface, the interface compatibility test is passed as depicted in block 60 and the versions are compatible. In this embodiment, note that the serializable and externalizable steps are not done simultaneously. Other embodiments may perform the various test in different orders or simultaneously.

Figure 4:
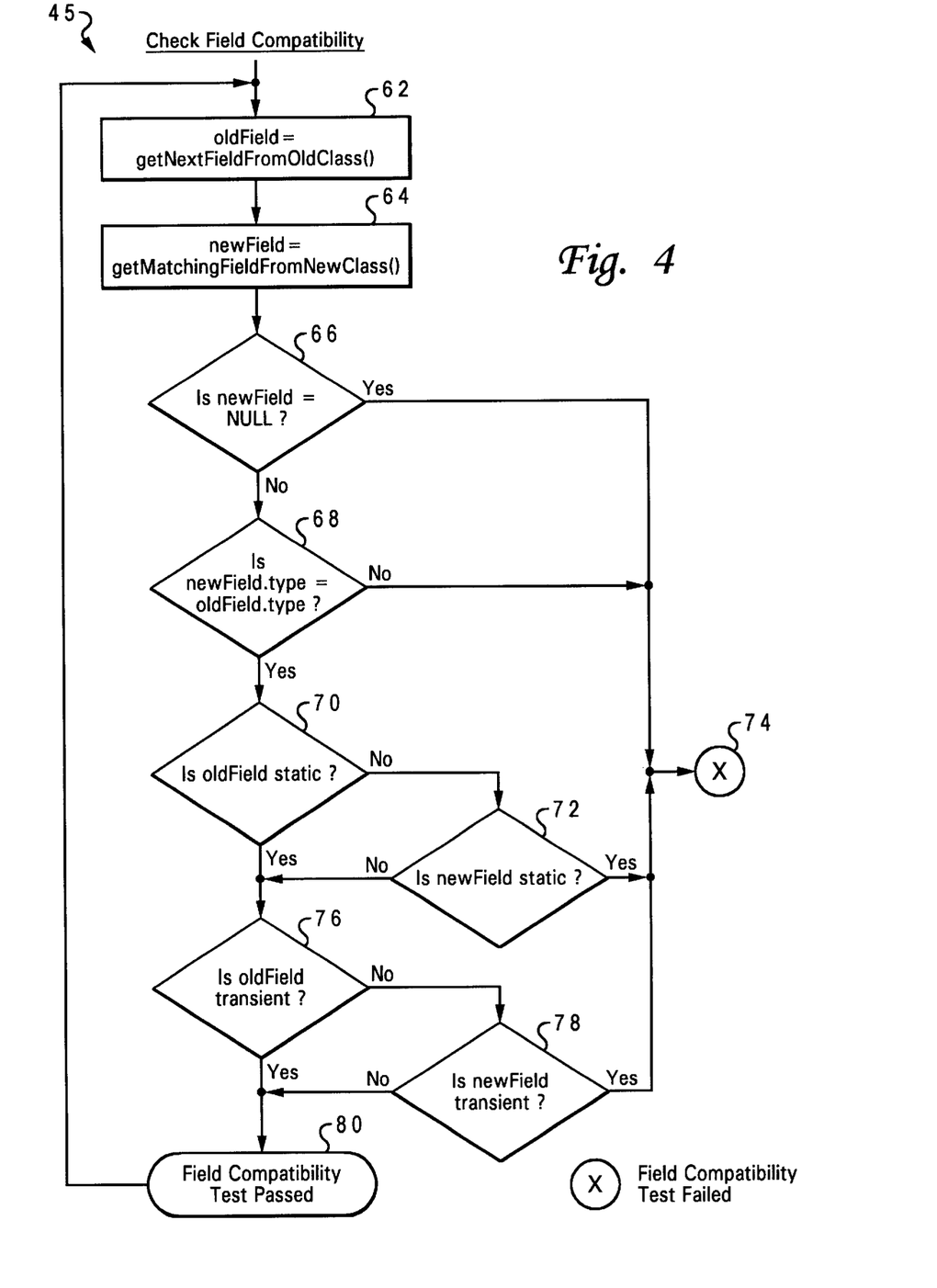
FIG. 4 is a high level flow diagram depicting the invention processing to check the field compatibility according to one implementation of the present invention.

FIG. 4 is a depiction of one embodiment of the means of checking the field compatibility 45 between the old version and the new version of a class. The field of the old version is first loaded onto the data processing system illustrated in block 62, then the respective field is loaded onto the data processing system as illustrated in block 64. If the new field is null as shown in block 66, meaning that there is no value for the new field or that the new field does not exist, then there is no compatibility and the user/programmer receives an output as depicted in block 74 showing this result. If however, a new field type exists, it is then checked against the old field type. If the new field type is equal to the old field type as illustrated in block 68 then there is compatibility with respect to that particular field type. If however, the new field type is not equal to the old field type, then the user is prompted with an output showing incompatibility as depicted in block 74. A determination is made as to whether the old field is static as shown in block 70. If the old field is not static then the new field is checked to determine if it is static as shown in block 72. If the new field is not static while the old field is static, the user is prompted with an output showing that the fields are not compatible as depicted in block 74. If both are not static or the old field is static, then the process continues by testing for the transient nature of the field. A determination is made as to whether the old field is transient as shown in block 76. If it is not transient, then the new field is tested to determine if it is transient as shown in block 78. If the new field is transient while the old field is not transient, then the user is prompted with an output that the fields are not compatible as depicted in block 74. If however, both the old field as shown in block 76 and the new field as shown in block 78 are intransient or the old field is transient, then the process completes its initial run. The field compatibility test is passed as illustrated in block 80 as to that particular field. The process continues to check for each field as is depicted by the loop linking the field compatibility test path with the beginning of FIG. 4 structure. It terminates when either all the fields in the class have been checked and are compatible or the non compatible result as depicted in block 74 is reached for one of the fields.

One implementation of the invention utilizes the technology of the Visual Age Web Runner Tool Kit BeanExtender developed by IBM. The BeanExtender technology extracts much of the complexity of dealing with a single bean and all related files by utilizing a single managed bean class and maintaining extracted persistent storage location. This makes it easier to develop tools which takes Beans as input and produce Beans as output. The invention is implemented as an algorithm within the set of algorithms available in BeanExtender. The BeanExtender solutions are 100% pure Java and are based on JavaSoft JDK 1.1.1. or above and facilitates the creation of plug and play Java component entry tailored for the enterprise through the modification extension, aggregation, scripting, management and deployment of Java Beans.

While the invention has been particularly shown and described with reference to a preferred embodiment, it will be understood by those skilled in the art that various changes in form and detail may be made therein without departing from the spirit and scope of the invention. For example, it is understood that the invention may be utilized either as a preventive measure in the test cycle of product development or alternatively it may be built into a builder tool so that the tool can warn the programmer as soon as changes are made to a class that might result in stream-incompatibility.

What is claimed is:

1. A process for determining the compatibility of two or more versions of a single serialized class of objects residing on a data processing system comprising the steps of:
    inputting two or more versions of the class into a process environment of the data processing system;
    dividing each version of the class into a serialized stream of elements originating from a component class of Java object-oriented programming language; and
    comparing the stream of elements of one version of the class with the stream of elements of another version of the class to find incompatible differences between the versions by introspecting each version of said Java class and determining if it is possible to reconstruct an instance of a newer version of the Java class from a serialized older version.

2. The process of determining compatibility of claim 1, wherein said comparing step includes comparing each individual element and a field of one version of the class against the individual elements and a field of the other version of the class and wherein any incompatible differences found result in an output to an output device of the data processing system.

3. The process of determining compatibility of claim 1, wherein said introspecting and determining steps matches implemented interfaces, data types of instances variables, class hierarchy, and method signatures in the two versions of the Java class.

4. The process of determining compatibility of claim 1, wherein said comparing step is completed on a serializable interface and an externalizable interface of the class.

5. The process of determining compatibility of claim 1, wherein said comparing steps checks compatibility between two versions of the class utilizing a set of predefined rules for type changes effecting serialization and wherein said differences which yield an incompatible result are identified from among:
    deletion of fields in a class;
    rearrangement of classes in the hierarchy;
    modification of a nonstatic field into a static field;
    modification of a transient field into a nontransient field;
    modification of a declared type of a primitive field;
    modification of a class from serializable to externalizable; and
    modification of a class from externalizable to serializable.

6. The process of determining compatibility of claim 1, wherein said comparing step is implemented utilizing a group of classes within two products to ensure product a compatibility.

7. The process of determining compatibility of claim 1, wherein said comparing step is implemented from another program by calling its static method command for class compatibility.

8. The process of determining compatibility of claim 1, wherein said comparing step is implemented utilizing a command line java tool which is invoked utilizing a java command function.

9. The process of determining compatibility of claim 1, wherein said comparing step is utilized to ensure backward compatibility.

10. A system for determining the compatibility of two or more versions of a single serialized class of objects residing on a data processing system comprising means for:
    inputting two or more versions of the class into a process environment of the data processing system;
    dividing each version of the class into a serialized stream of elements originating from a component class of Java object-oriented programming language; and
    comparing the stream of elements of one version of the class with the stream of elements of another version of the class to find incompatible differences between the versions by introspecting each version of said Java class and determining if it is possible to reconstruct an instance of a newer version of the Java class from a serialized older version.

11. The system for determining compatibility of claim 10, further comprising means for comparing each individual element and a field of one version of the class against the individual elements and a field of the other version of the class and wherein any incompatible differences found result in an output to an output device of the data processing system.

12. The system for determining compatibility of claim 10, wherein said means for introspecting and determining matches implemented interfaces, data types of instances variables, class hierarchy, and method signatures in the two versions of the Java class.

13. The system for determining compatibility of claim 10, wherein said means for comparing is completed on a serializable interface and an externalizable interface of the class.

14. The system for determining compatibility of claim 10, wherein said means for comparing checks compatibility between two versions of the class utilizing a set of predefined rules for type changes effecting serialization and wherein said differences which yield an incompatible result are identified from among:
    deletion of fields in a class;
    rearrangement of classes in the hierarchy;
    modification of a nonstatic field into a static field;
    modification of a transient field into a nontransient field;
    modification of a declared type of a primitive field;
    modification of a class from serializable to externalizable; and
    modification of a class from externalizable to serializable.

15. The system for determining compatibility of claim 10, comprising further of means for comparing is a group of classes within two products to ensure product compatibility.

16. The system for determining compatibility of claim 10, wherein said means for comparing is implemented from another program by calling its static method command for class compatibility.

17. The system for determining compatibility of claim 10, wherein said means for comparing is implemented utilizing a command line java tool which is invoked utilizing a java command function.

18. The system for determining compatibility of claim 10, further comprising of means for ensuring backward compatibility.

19. A computer program product comprising of:

a storage medium; and program instructions stored on said storage medium for determining the compatibility of two or more versions of a single serialized class of objects residing on a data processing system comprising (1) inputting two or more versions of the class into a process environment of the data processing system, (2) dividing each version of the class into a serialized stream of elements originating from a component class of Java object-oriented programming language, and (3) comparing the stream of elements of one version of the class with the stream of elements of another version of the class to find incompatible differences between the versions by introspecting each version of said Java class and determining if it is possible to reconstruct an instance of a newer version of the Java class from a serialized older version.

20. The computer program product of claim 19, comprising further of program instructions wherein said comparing step includes comparing each individual element and a field of one version of the class against the individual elements and a field of the other version of the class and wherein any incompatible differences found result in an output to an output device of the data processing system.

21. The computer program product of claim 19, comprising further of program instructions wherein said introspecting and determining steps matches implemented interfaces, data types of instances variables, class hierarchy, and method signatures in the two versions of the Java class.

22. The computer program product of claim 19, comprising further of program instructions wherein said comparing step is completed on a serializable interface and an externalizable interface of the class.

23. The computer program product of claim 19, comprising further of program instructions wherein said comparing steps checks compatibility between two versions of the class utilizing a set of predefined rules for type changes effecting serialization and wherein said differences which yield an incompatible result are identified from among:

deletion of fields in a class;

rearrangement of classes in the hierarchy;

modification of a nonstatic field into a static field;

modification of a transient field into a nontransient field;

modification of a declared type of a primitive field;

modification of a class from serializable to externalizable; and modification of a class from externalizable to serializable.

24. The computer program product of claim 19, comprising further of program instructions wherein said comparing step is implemented utilizing a group of classes within two products to ensure product compatibility.

25. The computer program product of claim 19, comprising further of program instructions wherein said comparing step is implemented from another program by calling its static method command for class compatibility.

26. The computer program product of claim 19, comprising further of program instructions wherein said comparing step is implemented utilizing a command line java tool which is invoked utilizing a java command function.

27. The computer program product of claim 19, comprising further of program instructions wherein said comparing step is utilized to ensure backward compatibility.

* * * * *

UNITED STATES PATENT AND TRADEMARK OFFICE
CERTIFICATE OF CORRECTION

PATENT NO.  : 6,298,353 B1
DATED       : October 2, 2001
INVENTOR(S) : Apte

It is certified that error appears in the above-identified patent and that said Letters Patent is hereby corrected as shown below:

<u>Column 11,</u>
Line 62, delete the word "a" at the end of the line.

Signed and Sealed this

Twenty-first Day of May, 2002

Attest:

JAMES E. ROGAN
*Attesting Officer*  *Director of the United States Patent and Trademark Office*